United States Patent
Anand et al.

(10) Patent No.: US 9,524,481 B2
(45) Date of Patent: *Dec. 20, 2016

(54) TIME SERIES TECHNIQUE FOR ANALYZING PERFORMANCE IN AN ONLINE PROFESSIONAL NETWORK

(71) Applicant: LinkedIn Corporation, Mountain View, CA (US)

(72) Inventors: Sathyanarayan Anand, San Francisco, CA (US); Guangde Chen, Sunnyvale, CA (US); Xin Fu, Santa Clara, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 14/151,517

(22) Filed: Jan. 9, 2014

(65) Prior Publication Data
US 2014/0358644 A1 Dec. 4, 2014

Related U.S. Application Data

(63) Continuation of application No. 13/907,506, filed on May 31, 2013, now Pat. No. 8,694,635.

(51) Int. Cl.
*G06Q 10/06* (2012.01)
*G06Q 50/00* (2012.01)

(52) U.S. Cl.
CPC .. *G06Q 10/06398* (2013.01); *G06Q 10/06375* (2013.01); *G06Q 50/01* (2013.01)

(58) Field of Classification Search
CPC .. G06F 11/3447; G06F 11/3452; G06F 17/18; G06Q 10/06375; G06Q 10/06398; G06Q 10/067; G06Q 50/01; G06Q 40/06; G06N 7/00; G06N 7/005; H04L 43/08

See application file for complete search history.

(56) References Cited

U.S. PATENT DOCUMENTS

| | | | |
|---|---|---|---|
| 6,470,464 B2 | 10/2002 | Bertram et al. | |
| 8,997,229 B1* | 3/2015 | Huang | G06F 21/554 709/223 |
| 2002/0069147 A1* | 6/2002 | Sheehan | G06Q 40/00 705/35 |
| 2003/0236878 A1 | 12/2003 | Egi | |

(Continued)

*Primary Examiner* — Brian J Gillis
*Assistant Examiner* — Gil H. Lee
(74) *Attorney, Agent, or Firm* — Park, Vaughan, Fleming & Dowler LLP (57) ABSTRACT

The disclosed embodiments relate to a system for analyzing performance in an online professional network. During operation, the system receives time series data for user actions, wherein for each user action, the time series data comprises a series of numbers associated with consecutive time intervals, wherein a given number indicates a number of times the user action occurred during the time interval. The system also receives time series data for performance metrics, wherein for each performance metric, the time series data comprises a series of numbers associated with consecutive time intervals, wherein a given number indicates the number of times the performance metric occurred during the time interval. The system then performs a time series analysis on the received time series data for user actions and performance metrics to determine relationships between the user actions and the performance metrics.

16 Claims, 7 Drawing Sheets

(56) References Cited

U.S. PATENT DOCUMENTS

2005/0060598 A1    3/2005  Klotz et al.
2009/0234720 A1*  9/2009  George ................. G06Q 10/06
                                                705/7.42
2011/0302112 A1*  12/2011  Shan ................... G06Q 10/067
                                                706/12

* cited by examiner

TIME SERIES TECHNIQUE FOR ANALYZING PERFORMANCE IN AN ONLINE PROFESSIONAL NETWORK

RELATED CASE

This application is a continuation application of, and hereby claims priority under 35 U.S.C. §120 to, pending U.S. patent application Ser. No. 13/907,506, by inventors Sathyanarayan Anand, Guangde Chen and Xin Fu, entitled "Time Series Technique for Analyzing Performance in an Online Professional Network," filed on 31 May 2013.

RELATED ART

The disclosed embodiments generally relate to techniques for analyzing performance metrics in online professional networks. More specifically, the disclosed embodiments relate to a system that uses a time series analysis technique to determine how user actions influence performance metrics in an online professional network.

BACKGROUND

Perhaps the most significant development on the Internet in recent years has been the rapid proliferation of online social networks, such as Facebook™ and LinkedIn™. Billions of users are presently accessing such social networks to connect with friends and acquaintances and to share personal and professional information. In order to be successful, such online social networks need to carefully monitor their performance to spot fast-moving trends and to determine the effectiveness of various modifications to their social-networking sites, such as the addition of new features.

These social-networking sites typically measure their performance using metrics, such as "number of page views," "number of unique users" or "revenue per user." However, it can be challenging to determine how various factors influence these metrics. For example, if adding a new feature to a social-networking site increases the number of member-to-guest invitations, how does this affect the number of page views a month from now? Sophisticated analysis tools are needed to answer such questions.

DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

As mentioned above, the disclosed embodiments relate to a system that uses a time series analysis technique to determine how user actions influence performance metrics in an online professional network. Before we describe the details of this technique, we first describe an exemplary computing environment in which such a system can operate.

Computing Environment

Figure 1:
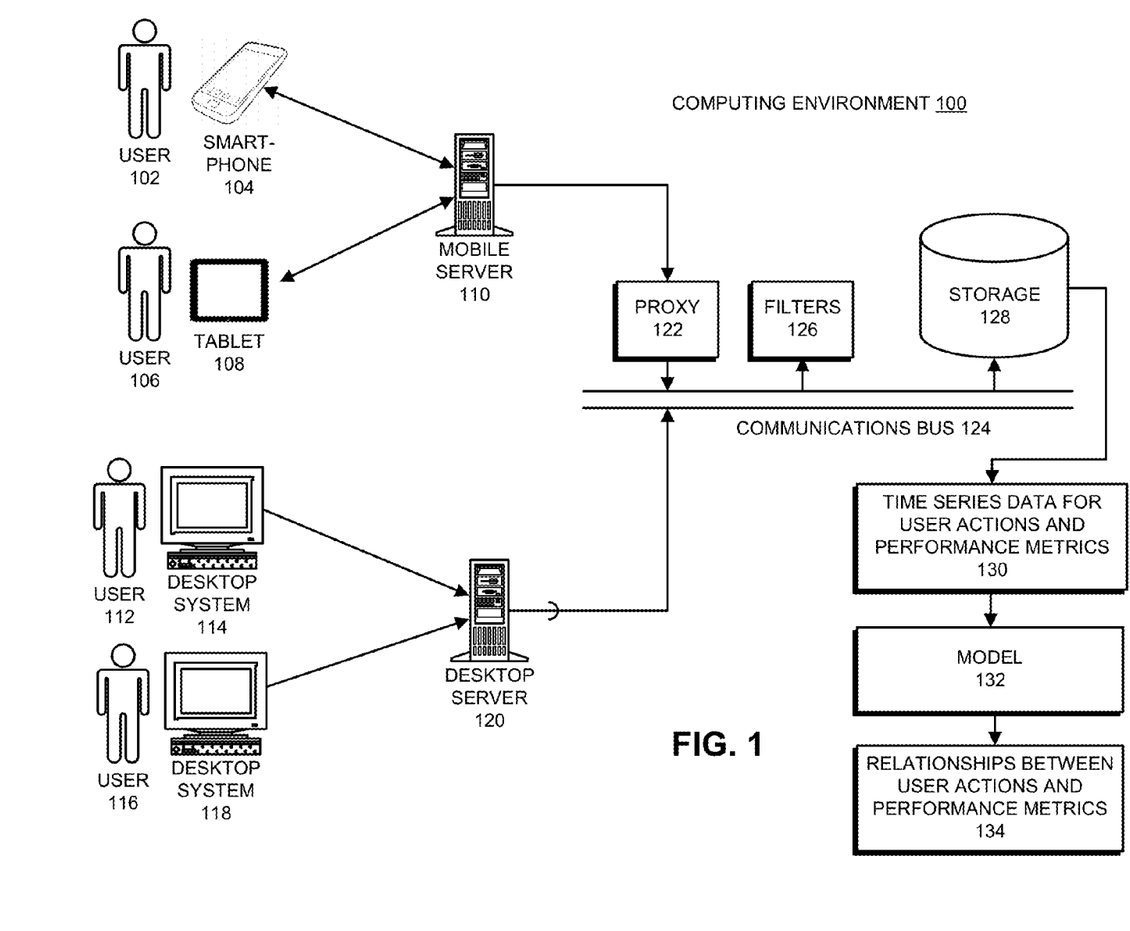
FIG. 1 illustrates a computing environment in accordance with the disclosed embodiments.

FIG. 1 illustrates an exemplary computing environment 100 for an online professional network in accordance with the disclosed embodiments. Note that the system illustrated in FIG. 1 gathers usage metrics for mobile applications that act as access gateways to an online professional network (such as LinkedIn™) from associated mobile devices, including a smartphone 104 and a tablet computer 108. These usage metrics can include user actions, such as editing a user's profile or endorsing another user, or performance metrics, such as number of page views. The system illustrated in FIG. 1 also gathers usage metrics for browsers on desktop systems 114 and 118 that access a website associated with the online professional network.

More specifically, mobile devices 104 and 108, which are operated by users 102 and 106 respectively, execute mobile applications that function as portals to the online professional network, which is hosted on mobile server 110. (Note that a mobile device can generally include any type of portable electronic device that can host a mobile application, including a smartphone, a tablet computer, a network-connected music player, a gaming console and possibly a laptop computer system).

Mobile devices 104 and 108 communicate with mobile server 110 through one or more networks (not shown), such as a WiFi network, a Bluetooth™ network or a cellular data network. During operation, the mobile applications send various types of usage metrics (which are described in more detail below) to mobile server 110. Mobile server 110 in turn forwards this metrics information through a proxy 122 onto a communications bus 124. These usage metrics are ultimately stored in storage system 128 and can also be processed using various filters 126 to detect certain types of page views and/or actions, or patterns of page views and/or actions. Although the illustrated embodiment shows only two mobile devices, in general there can be a large number of mobile devices and associated mobile application instances (possibly thousands or millions) that simultaneously send usage information through communications bus 124 to storage system 128.

Note that the usage information can be sent to mobile server 110 whenever it is generated by the mobile applications. Alternatively, the usage information can be aggregated on mobile devices 104 and 108 and can be sent periodically to mobile server 110 in larger blocks.

Also, desktop systems 114 and 118, which are operated by users 112 and 116, respectively, can periodically transmit usage metrics to desktop server 120, and desktop server 120 can forward this usage information to communications bus 124. This usage information from desktop systems 114 and 118 can similarly be stored in storage device 128 and can also be processed by filters 126.

If desktop server 120 hosts a website, which is accessed through browsers on desktop systems 114 and 118, then the website can possibly gather the usage metrics instead of relying on XML or HTML code in the browsers to gather the usage information. This website can keep track of how a specific user navigates through the website.

Communications bus 124, proxy 122, filters 126 and storage device 128 can be located on one or more servers distributed across a network. Also, mobile server 110, desktop server 120, proxy 122, communications bus 124, filters 126 and storage device 128 can be hosted in a virtualized cloud-computing system.

The system retrieves data from storage system 128 to assemble time series data for user actions and performance metrics 130. (The structure of this time series data is described in more detail below with reference to FIG. 2.) This time series data is subsequently used to construct a model 132 for performance of the online professional network. Finally, the model is used to determine relationships between user actions and performance metrics 134. This model is highly non-linear and is consequently not solvable, so we need to use another model to estimate it. (Note that the structure of the model and its use in determining these relationships and the associated estimation technique is also described in more detail below).

Time Series Data

Figure 2:
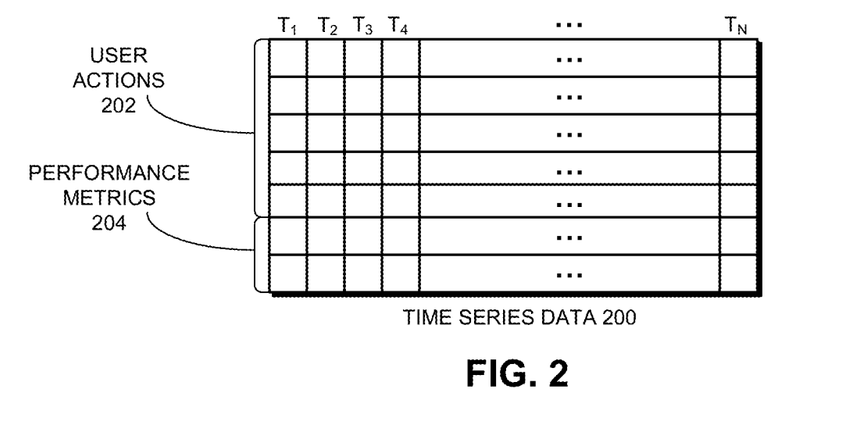
FIG. 2 illustrates time series data in accordance with the disclosed embodiments.

FIG. 2 illustrates time series data 200 in accordance with the disclosed embodiments. Time series data 200 includes a series of integer values representing how many times specific user actions 202 (or actions associated with performance metrics 204) occur during associated time intervals. In one exemplary embodiment, for an online professional network such as LinkedIn™ the user actions can include: user profile edits; member-to-member invitations; member-to-guest invitations; endorsements; people follows; company follows; and user status updates. Moreover, in the same embodiment, the performance metrics can include: page views; unique users; revenue per user; sign ups; and mobile application activations. Note that the above-listed user actions and performance metrics are merely presented as an example and are not meant to limit other embodiments. In general, the system can manipulate fewer or more user actions and performance metrics.

Analyzing Relationships Between User Actions and Performance Metrics

Figure 3:
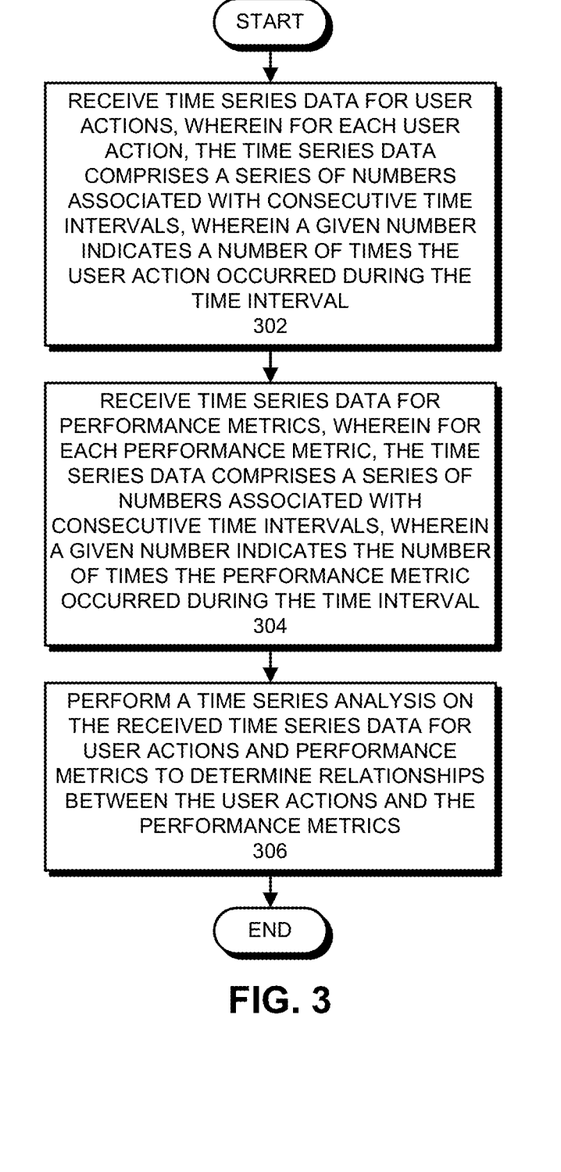
FIG. 3 presents a flow chart illustrating how the system analyzes relationships between user actions and performance metrics in accordance with the disclosed embodiments.

FIG. 3 presents a flow chart illustrating how the system analyzes relationships between user actions and performance metrics in accordance with the disclosed embodiments. At the start of this process, the system receives time series data for user actions, wherein for each user action, the time series data comprises a series of numbers associated with consecutive time intervals, wherein a given number indicates a number of times the user action occurred during the time interval (step 302). The system also receives time series data for performance metrics, wherein for each performance metric, the time series data comprises a series of numbers associated with consecutive time intervals, wherein a given number indicates the number of times the performance metric occurred during the time interval (step 304). Finally, the system performs a time series analysis on the received time series data for user actions and performance metrics to determine relationships between the user actions and the performance metrics (step 306). This time series analysis is described in more detail below.

Process of Constructing and Solving (or Estimating) a Model

Figure 4:
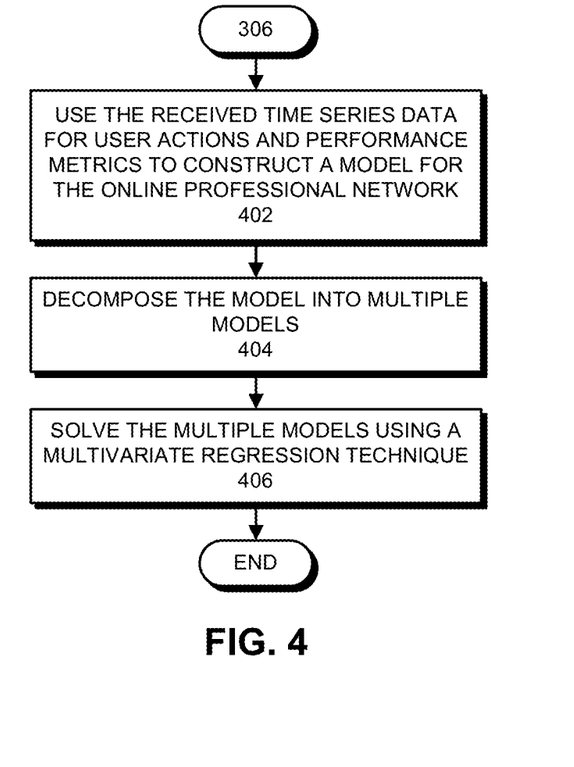
FIG. 4 presents a flow chart illustrating how the time series data is used to construct and solve a model in accordance with the disclosed embodiments.

The process of performing the time series analysis involves constructing a model. More specifically, FIG. 4 presents a flow chart illustrating how the time series data is used to construct and solve (or estimate) a model in accordance with the disclosed embodiments. First, the system uses the received time series data for user actions and performance metrics to construct a model for the online professional network (step 402). Next, the system decomposes the model into multiple models (step 404) in a process, which is described in more detail below. Finally, the system solves (or estimates) the multiple models using a multivariate regression technique (step 406) to determine relationships between user actions and associated performance metrics.

Time Series Analysis Details

We now present more details about a specific time series analysis technique that can be used to analyze the performance of an online professional network. Data obtained from an online professional network, such as LinkedIn™, tends to contain a seasonal component and a regular component in terms of time series models and these components are highly correlated. To better suit the statistical analysis for such data, we adopt Seasonal Vector AutoRegressive Integrated Moving Average time series models with eXogenous variables (SVARIMAX). We have designed a methodology to sequentially fit these models. We have also successfully applied the models to data from an online professional network. This methodology can avoid the over-fitting problem by using selection at each step to pick up important or valuable exogenous variables. The resulting fitted models can accurately recover performance trends and can make accurate predictions.

Many Internet companies define their performance using "page views" and "unique users." We would like to understand how user action metrics associated with an online professional network affect these performance metrics.

These user action metrics can include: people follows, company follows, endorsements, guest invitations, member invitations, profile edits, and status updates.

Figure 5:
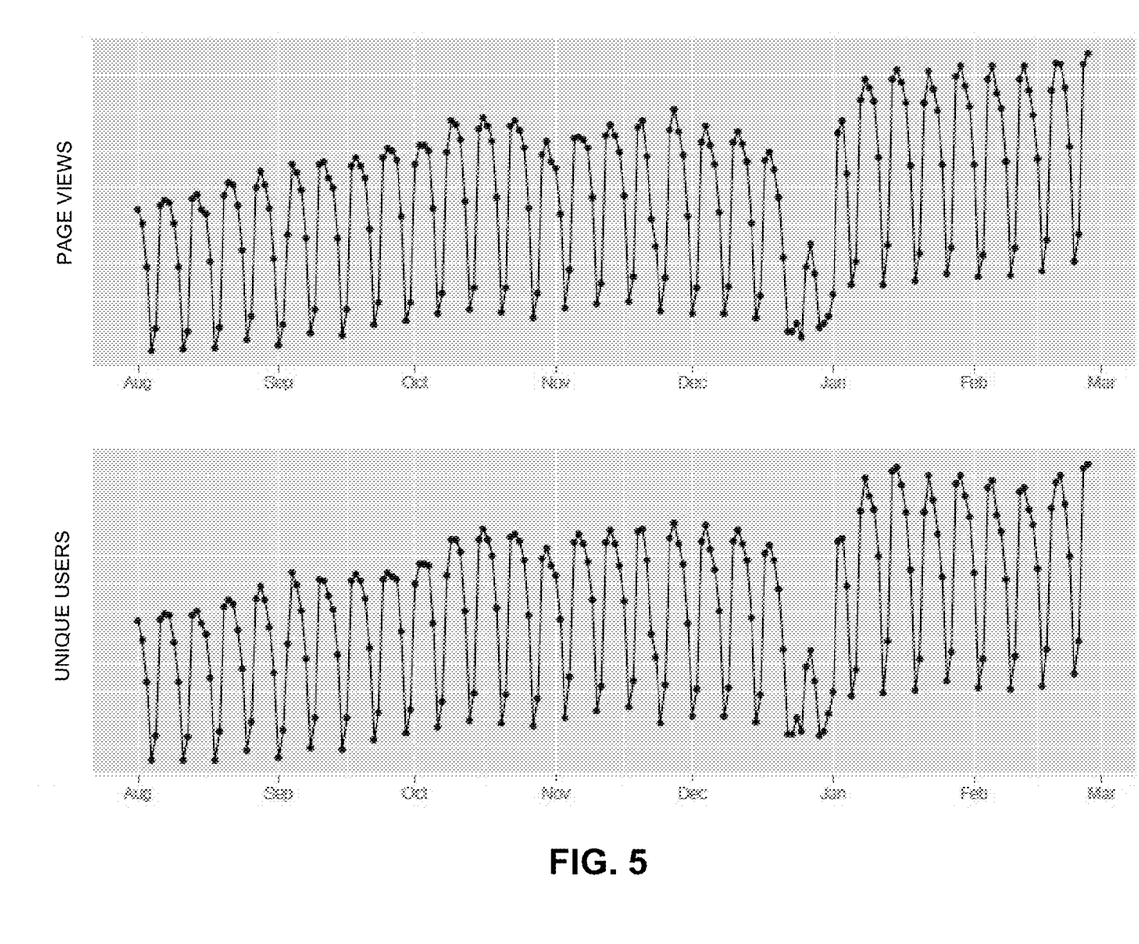
FIG. 5 presents time series plots for page views and unique users in accordance with the disclosed embodiments.
Figure 6:
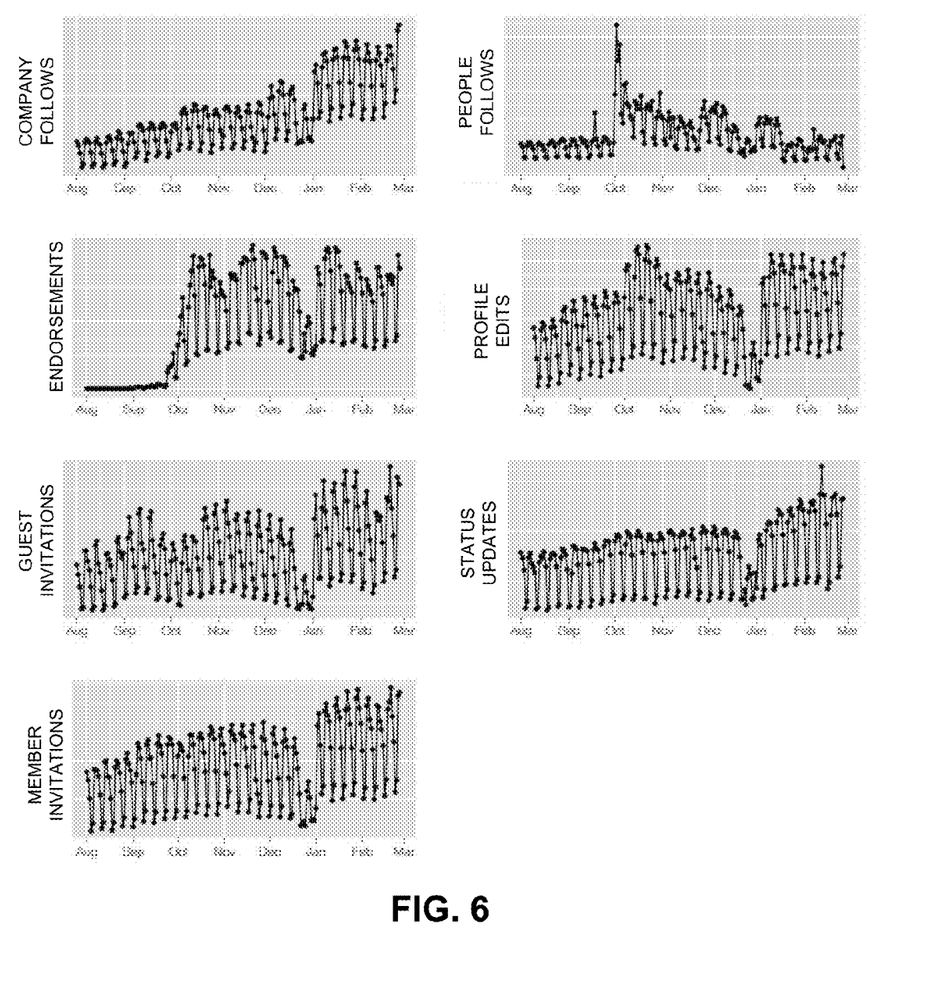
FIG. 6 presents time series plots for user actions in accordance with the disclosed embodiments.
Figure 7:
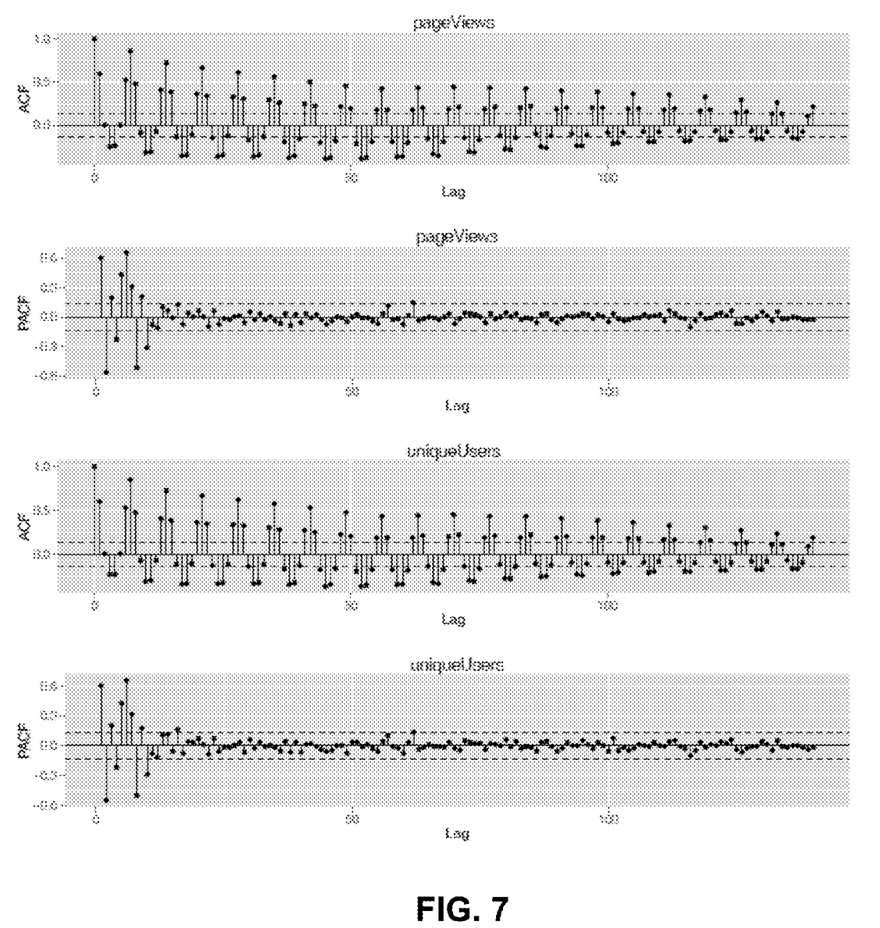
FIG. 7 presents ACF and PACF plots for page views and unique users in accordance with the disclosed embodiments.

Performance metrics and user action can be expressed in time series form. For example, FIG. 5 presents time plots of page views and unique users for an online professional network from August 1 to February 26. FIG. 6 presents corresponding time plots of associated user action metrics for the same period. Note that all of these time series exhibit strong weekly and seasonal patterns. As we can see from the autocorrelation function (ACF) and partial autocorrelation function (PACF) of page views and unique users in FIG. 7, non-stationarity exists in these time series. At the same time, page views has the same pattern as unique users simply because they are highly correlated. To overcome these challenges, we adopt Seasonal Vector AutoRegressive Integrated Moving Average time series models with eXogenous variables (SVARIMAX), which are more applicable to analyzing data from an online professional network.

Our methodology involves decomposing the SVARIMAX into several models and sequentially solving them using multivariate regression and incorporating a variable selection method called Least Absolute Shrinkage and Selection Operator (LASSO) for lag selections in the action metrics.

SVARIMAX (p,d,q,P,D,Q,b) Models

Suppose that the seasonality is s (s≥2) and let B be a back-shift operator. We shall describe the SVARIMAX models first, which contain both a seasonal effect and a regular effect. If we assume these effects are roughly orthogonal to each other, then we have the multiplicative seasonal vector time series models in (1).

$$\left(I - \sum_{i=1}^{p} \phi_i B^i\right)\left(I - \sum_{i=1}^{P} \Phi_i B^{is}\right) y_t = a_0 + \left(I - \sum_{i=1}^{q} \theta_i B^i\right)\left(I - \sum_{i=1}^{Q} \Theta_i B^{is}\right)\varepsilon_t, \quad (1)$$

where $y_t=(y_{1t}, \ldots, y_{kt})$ is a k-dimensional time series observed at equally spaced time points, $\phi_i$, $\Phi_i$, $\theta_i$, and $\Theta_i$ are k×k matrices, and $a_0$ is a k-dimensional constant. P and Q denote the order of the seasonal time series model, while p and q denote the order of the regular time series model.

In the multiplicative seasonal vector time series model (1), the parameters $\phi_i$, $\Phi_i$, $\theta_i$, and $\Theta_i$ are not identifiable without other constraints. In other words, we cannot estimate the parameters one by one. However, this has nothing to do with the forecasting. Hence, it does not hurt our goal in analyzing data from an online professional network. Another assumption is the stationarity of $y_t$. So, if the time series are not stationary, we need to take the difference of both the seasonal model and the regular model; thus, we have two more parameters d and D leading to our SVARIMAX (p,d,q,P,D,Q) model.

We can incorporate external information into time series modeling. For our data from an online professional network, we would like to evaluate the value of actions in the time series model. Since all the actions are time series, we also consider the lagged variables from each time series.

Therefore, we consider the SVARIMAX (p,d,q,P,D,Q,b) models in (2) for our data.

$$\left(I - \sum_{i=1}^{p} \phi_i B^i\right)\left(I - \sum_{i=1}^{P} \Phi_i B^{is}\right) y_t = \quad (2)$$

-continued $$a_0 + \left(I - \sum_{i=1}^{q} \theta_i B^i\right)\left(I - \sum_{i=1}^{Q} \Theta_i B^{is}\right)\varepsilon_t + X_{t(T)} b,$$

where $X_{t(T)}$ is a lagged matrix from exogenous variable $X_t$.

Computation Technique

In this section, we describe an algorithm that fits the SVARIMAX (p,d,q,P,D,Q,b) models in (2).

Step 0. Detect seasonality. If ACF shows spikes at some specified intervals, then the seasonality will be equal to the length of cycle. For our data, we have weekly-cyclical time series and the ACF will spike at lags of 7, 14, 21, ..., 7n. Therefore, the seasonality is 7 days for this data.

Step 1. Deal with non-stationarity. In other words, we can find out the parameters d and D. If the ACF or PACF decays very slowly to zero, then there is non-stationarity in the time series. To stationarize the time series, we usually use the difference between the data points. However, overdifferencing the time series will induce bias in the estimations and hurt the predictions. Nevertheless, we can test the stationarity with an Augmented Dickey-Fuller test (ADF). For our data, we find out d is usually 1 and D is 0.

Step 2. Construct (Structural Vector AutoRegression) SVAR (p,P). Assume $y_t$ has been stationarized from Step 1. We need to solve the multivariate regression in (3).

$$y_t = a_0 + \sum_{j=1}^{p} \phi_j y_{t-j} + \sum_{i=1}^{P} \Phi_i y_{t-is} - \sum_{i=1}^{P}\sum_{j=1}^{p} \Phi_i \phi_j y_{t-j-is} + \varepsilon_t. \quad (3)$$

The criteria to select p and P include AIC and BIC. Our empirical test for our data shows that p is not more than 4, and P is not more than 2.

Step 3. Construct (Structural Vector Moving Average) SVMA (q,Q). We pick up residuals from Step 2 and solve the multivariate regression in (4).

$$\varepsilon_t = \sum_{j=1}^{q} \theta_j \varepsilon_{t-j} + \sum_{i=1}^{Q} \Theta_i y_{t-is} - \sum_{i=1}^{P}\sum_{j=1}^{p} \Theta_i \theta_j \varepsilon_{t-j-is} + \omega_t. \quad (4)$$

As we can see, it is virtually a SVAR (q,Q) model. Our test shows that this is not a necessary step because the SVAR and SVMA are exchangeable in the time series models. For our data, we can set both d and D as 0 for simplicity.

Step 4. Select important lagged exogenous variables. Once again, we take the residuals from Step 3 and apply some variable selection methods to select the important variables in (5).

$$\omega_t = X_{t(T)} b + v_t \quad (5)$$

One of the most famous variable selection methods is LASSO. The statistical judgment for this step is because the residuals are roughly independent after Step 3. As a result, the LASSO method can be applied without any restrictions.

Finally, we should check the correctness of the fit of the final model by doing model diagnostics.

CONCLUSION

We have developed an algorithm to fit the Seasonal Vector AutoRegressive Integrated Moving Average time series models with eXogenous variables (SVARIMAX) better suitable for data from an online professional network. Our strategy is to decompose the large model into several small models and sequentially fit each of them; then, we make use of the independent properties of residuals to incorporate the existing variable selection method into the model selection.

The foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A computer-implemented method for analyzing performance in an online professional network, the method comprising:
    receiving time series data for user actions, wherein for each user action, the time series data comprises a series of numbers associated with consecutive time intervals, wherein a given number indicates a number of times the user action occurred during the time interval;
    receiving time series data for performance metrics, wherein for each performance metric, the time series data comprises a series of numbers associated with consecutive time intervals, wherein a given number indicates the number of times the performance metric occurred during the time interval;
    performing a time series analysis by:
        using the received time series data for user actions and performance metrics to construct a time series model;
        stationarizing the time series model based on differences between data points in the time series data;
        performing one or more regressions on the stationarized time series model to produce a set of residuals;
        selecting lagged exogenous variables for the time series model based on the set of residuals using a Least Absolute Shrinkage and Selection Operator method; and
        solving the time series model with the selected lagged exogenous variables using a multivariate regression technique; and
    using the time series analysis to determine an impact of a new feature in the online professional network.

2. The computer-implemented method of claim 1, wherein performing the time series analysis involves determining cross-correlations between the user actions and the performance metrics.

3. The computer-implemented method of claim 1, wherein performing the time series analysis involves determining cross-correlations between the user actions.

4. The computer-implemented method of claim 1, wherein determining the impact of the new feature in the online professional network involves:
    applying the time series analysis to historic data to estimate a model for the online professional network;
    using the estimated model to forecast performance of the online professional network without the new feature installed;
    measuring performance of the online professional network with the new feature; and
    determining the impact of the new feature by computing the difference between the measured performance with the new feature and the forecast performance without the new feature.

5. The computer-implemented method of claim 1, wherein the user actions include one or more of the following:
    user profile edits;
    member-to-member invitations;
    member-to-guest invitations;
    endorsements;
    people follows;
    company follows; and
    user status updates.

6. The computer-implemented method of claim 1, wherein the performance metrics include one or more of the following:
    page views;
    unique users;
    revenue per user;
    sign ups; and
    mobile application activations.

7. The computer-implemented method of claim 1, wherein the time series data for user actions and performance metrics is aggregated across all users in the online professional network.

8. A non-transitory computer-readable storage medium storing instructions that when executed by a computer cause the computer to perform a method for analyzing performance in an online professional network, the method comprising:
    receiving time series data for user actions, wherein for each user action, the time series data comprises a series of numbers associated with consecutive time intervals, wherein a given number indicates a number of times the user action occurred during the time interval;
    receiving time series data for performance metrics, wherein for each performance metric, the time series data comprises a series of numbers associated with consecutive time intervals, wherein a given number indicates the number of times the performance metric occurred during the time interval;
    performing a time series analysis by:
        using the received time series data for user actions and performance metrics to construct a time series model;
        stationarizing the time series model based on differences between data points in the time series data;
        performing one or more regressions on the stationarized time series model to produce a set of residuals;
        selecting lagged exogenous variables for the time series model based on the set of residuals using a Least Absolute Shrinkage and Selection Operator method; and
        solving the time series model with the selected lagged exogenous variables using a multivariate regression technique; and
    using the time series analysis to determine an impact of a new feature in the online professional network.

9. The non-transitory computer-readable storage medium of claim 8, wherein performing the time series analysis involves determining cross-correlations between the user actions and the performance metrics.

10. The non-transitory computer-readable storage medium of claim 8, wherein performing the time series analysis involves determining cross-correlations between the user actions.

11. The non-transitory computer-readable storage medium of claim 8, wherein determining the impact of the new feature in the online professional network involves:

applying the time series analysis to historic data to estimate a model for the online professional network;

using the estimated model to forecast performance of the online professional network without the new feature installed;

measuring performance of the online professional network with the new feature; and determining the impact of the new feature by computing the difference between the measured performance with the new feature and the forecast performance without the new feature.

12. The non-transitory computer-readable storage medium of claim 8, wherein the user actions include one or more of the following:
- user profile edits;
- member-to-member invitations;
- member-to-guest invitations;
- endorsements;
- people follows;
- company follows; and
- user status updates.

13. The non-transitory computer-readable storage medium of claim 8, wherein the performance metrics include one or more of the following:
- page views;
- unique users;
- revenue per user;
- sign ups; and
- mobile application activations.

14. A system that analyzes performance in an online professional network, comprising:
- a computing system comprising a processor and a memory;
- wherein the computing system is configured to:
  - receive time series data for user actions, wherein for each user action, the time series data comprises a series of numbers associated with consecutive time intervals, wherein a given number indicates a number of times the user action occurred during the time interval;
  - receive time series data for performance metrics, wherein for each performance metric, the time series data comprises a series of numbers associated with consecutive time intervals, wherein a given number indicates the number of times the performance metric occurred during the time interval;
  - perform a time series analysis by:
    - using the received time series data for user actions and performance metrics to construct a time series model;
    - stationarizing the time series model based on differences between data points in the time series data;
    - performing one or more regressions on the stationarized time series model to produce a set of residuals;
    - selecting lagged exogenous variables for the time series model based on the set of residuals using a Least Absolute Shrinkage and Selection Operator method; and
    - solving the time series model with the selected lagged exogenous variables using a multivariate regression technique; and
  - use the time series analysis to determine an impact of a new feature in the online professional network.

15. The system of claim 14, wherein while performing the time series analysis, the computing system is configured to determine cross-correlations between the user actions and the performance metrics.

16. The system of claim 14, wherein while performing the time series analysis, the computing system is configured to determine cross-correlations between the user actions.

* * * * *